(12) United States Patent
Pospíšil et al.

(10) Patent No.: US 6,574,885 B1
(45) Date of Patent: Jun. 10, 2003

(54) CYCLONE HEAT EXCHANGER

(75) Inventors: Jaroslav Pospíšil, Přerov (CZ); Josef Žajdlík, Přerov (CZ); Zdeně K Michálek, Přerov (CZ); Petr Krejčí, Přerov (CZ); Alois Pumprla, Přerov (CZ)

(73) Assignee: Tetrapat (CZ)

( * ) Notice: Subject to any disclaimer, the term of this patent is extended or adjusted under 35 U.S.C. 154(b) by 0 days.

(21) Appl. No.: 09/869,381

(22) PCT Filed: Dec. 23, 1999

(86) PCT No.: PCT/CZ99/00052

§ 371 (c)(1),
(2), (4) Date: Jun. 28, 2001

(87) PCT Pub. No.: WO00/39044

PCT Pub. Date: Jul. 6, 2000

(30) Foreign Application Priority Data

Dec. 28, 1998 (CZ) .............................. 4319-98

(51) Int. Cl.[7] .............................. F26B 17/00
(52) U.S. Cl. .............................. 34/592; 34/376; 34/90; 110/233; 432/106
(58) Field of Search .............................. 34/427, 376, 576, 34/591, 592, 90, 201; 110/233, 301, 302, 246; 432/14, 106, 58

(56) References Cited

U.S. PATENT DOCUMENTS

| | | | | |
|---|---|---|---|---|
| 3,618,916 A | * | 11/1971 | Giorgi | 263/32 R |
| 3,864,075 A | * | 2/1975 | Christainsen | 432/106 |
| 3,925,091 A | * | 12/1975 | Yoshida et al. | 106/100 |
| 4,119,396 A | * | 10/1978 | Abelitis et al. | 432/106 |
| 4,209,296 A | | 6/1980 | Deussner | |
| 4,477,251 A | * | 10/1984 | Cosar et al. | 432/106 |
| 4,583,943 A | * | 4/1986 | Cosar et al. | 432/14 |
| 4,640,681 A | * | 2/1987 | Steinbiss et al. | 432/14 |

FOREIGN PATENT DOCUMENTS

| | | |
|---|---|---|
| DE | 1 433 852 | 2/1969 |
| GB | 1154012 | 6/1969 |

* cited by examiner

Primary Examiner—Ira S. Lazarus
Assistant Examiner—K. B. Rinehart
(74) Attorney, Agent, or Firm—Renner, Kenner, Greive, Bobak, Taylor & Weber

(57) ABSTRACT

The cyclone heat exchanger according to the invention comprises a set of cyclones for preheating powdered raw material. The set of cyclones is divided into a high temperature part (1) and a low temperature part (2) mutually interconnected by a tube (4) with a return loop (40) which is located below the lever of lower cyclone (21) of low temperature part (2). The powdered raw material is transferred from the low temperature part (2) to the high temperature part (1) by means of a transport tube (50), fed with hot transporting gas. The high temperature part (1) and the low temperature part (2) are located in such a way, that the connection of the warm gas input (130) of the highest cyclone (13) of high temperature part (1) is located above the connection of warm gas input (210) of lower cyclone (21).

5 Claims, 2 Drawing Sheets

CYCLONE HEAT EXCHANGER

TECHNICAL FIELD OF THE INVENTION

Figure 1:
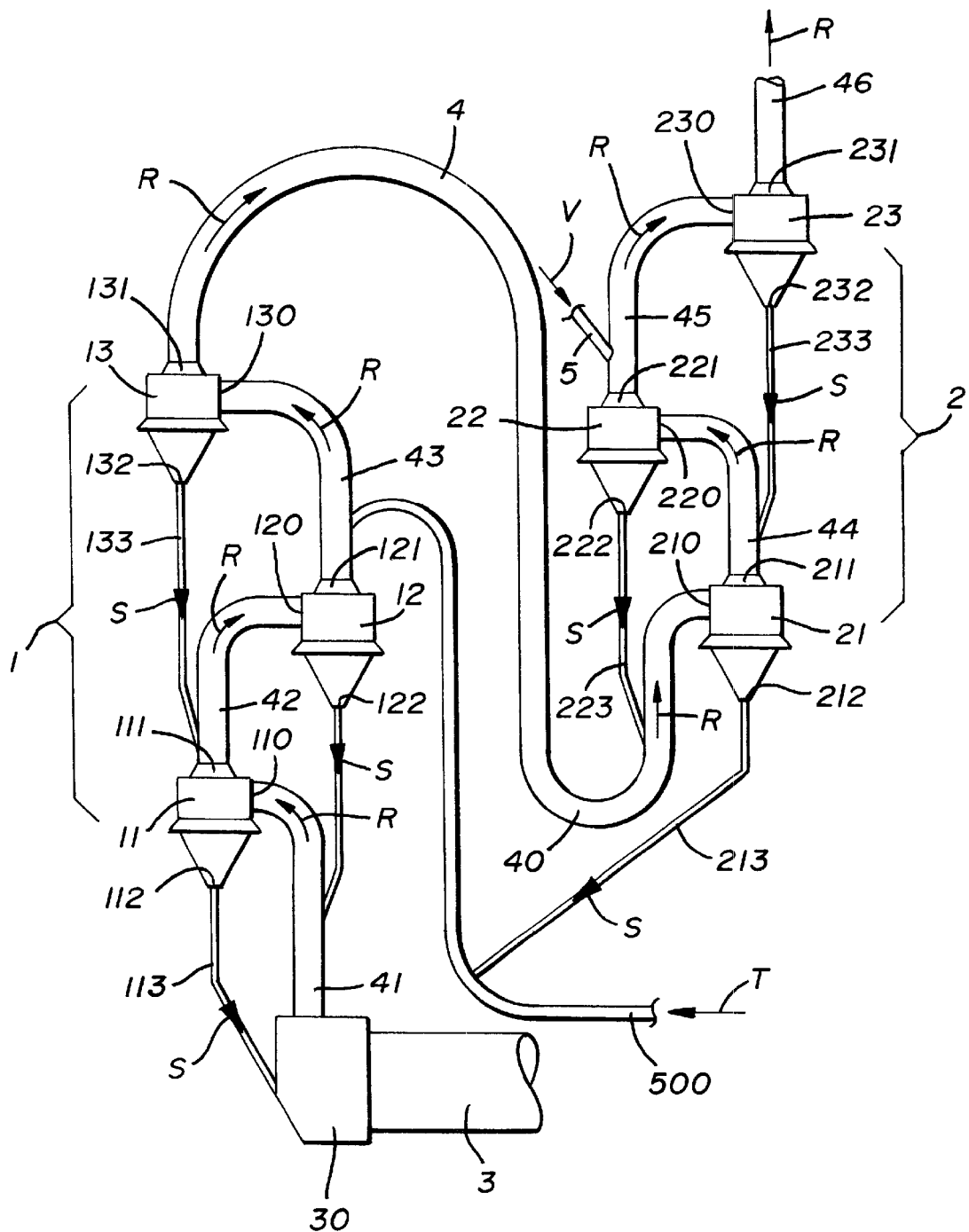
Figures 2, 3:
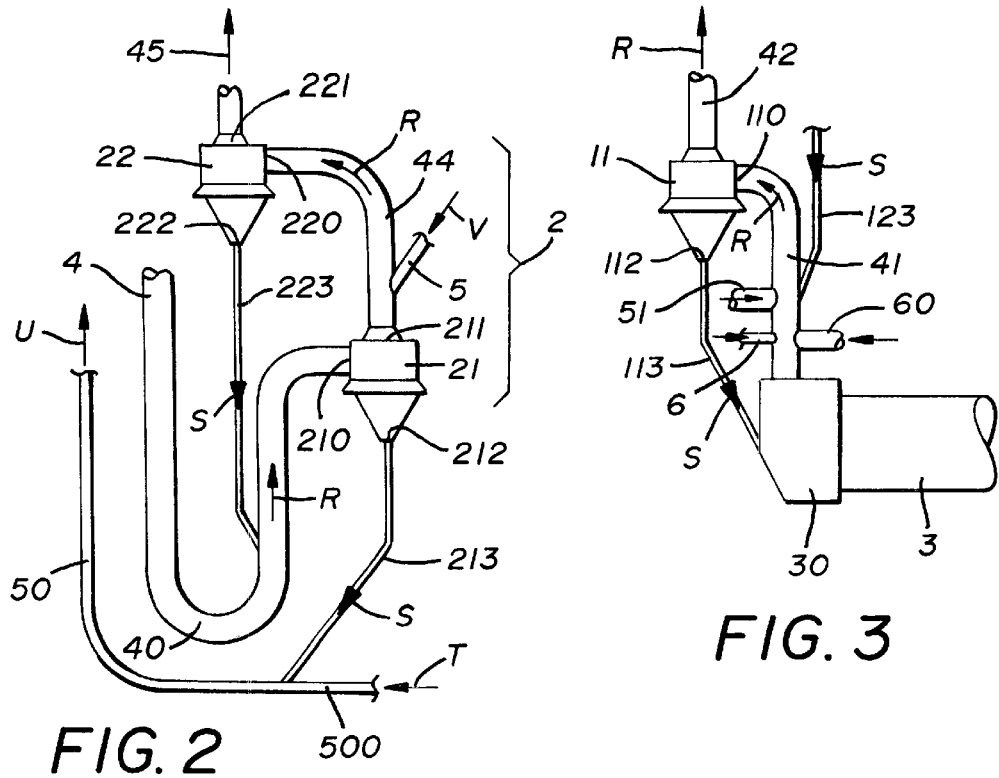
Figure 4:
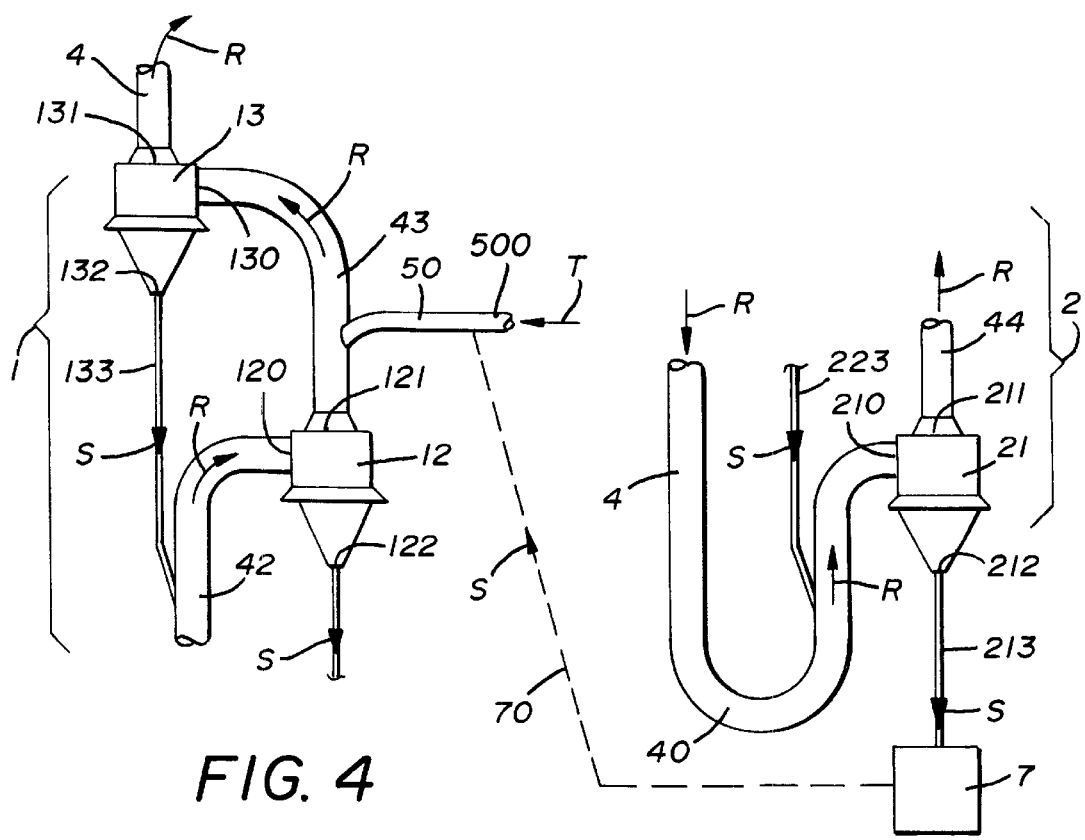

The invention deals with a cyclone heat exchanger for preheating of powdered raw material, where the exchanger is consisting from a set of cyclones, which are mutually on different height level, and the cyclones are connected in series and they are connected with the tubes of hot gas such a way that the input of the first cyclone is connected to the hot gas source and the output of each cyclone is assigned to the input of the next cyclone and the raw material output from each cyclone is led to the beginning of hot gas tube from the previous cyclone.

THE PRIOR ART

The up to now known heat exchangers for preheating of powdered raw material before its next processing, for instance for preheating of raw material farina at dry method of cement clinker production, are realized with in series arranged heat exchanging stages. They are arranged mutually in series over each other, what—especially at units with greater heat gradient and so with greater number of heat exchanging stages—is highly demanding for the building work and for the assembly of corresponding equipment and which besides other is manifesting with inconvenient increase of costs to the unit of end product.

The problem of undesirable building height can be solved so, that the in series arranged heat exchanging cyclones are located beside each other and the individual gas tubes, which are interconnecting them, have to considerably descend under the level of individual cyclones. That means however a substantially increased extent of the propre technologic equipment and additionally that is to the expense of a fluent material movement and heating up gases during the technologic process, which once more manifests in an increase of investment and operation costs.

THE AIM OF THE INVENTION

The disadvantages of up to now realized design arrangements are in substantial extent removed by the object of the invention, which is a cyclone heat exchanger for preheating of powdered raw material, composed from a set of cyclones, which are connected in series and interconnected with hot gas tubes such a way, that the input of the first cyclone is connected to the hot gas source and the output of each cyclone is assigned to the input of the next cyclone and the raw material output from each cyclone is led to the tube, assigned to the hot gas output from the previous cyclone.

The principle of the invention is that the set of cyclones is divided to two parts, a high temperature part nearer to the hot gas source, and a low temperature part and where each part is composed from at least two cyclones and which are mutually interconnected with a connecting tubing, on the end closer to the low temperature part of which a return loop is built up such a way that its lowest part is laying under the level of lower cyclone on the low temperature part, and that the high temperature part and the low temperature part are mutually located so that the connection of the warm gas inlet of the highest cyclone of high temperature part is situated higher as the connection of the warm gas inlet of the lower cyclone of the low temperature part, whereas the output of powdered raw material of the next cyclone of low temperature part is led to the ascending part of the return loop, whereas the high temperature part is further equipped with a transport tube to which the output tube of lower cyclone of low temperature part is led and which is led to the tube connecting the hot gas input of the highest cyclone of high temperature part and hot gas output from the previous cyclone. Here the input part of the transport tube is advantageously situated under the powdered raw material output level of the lower cyclone of the low temperature part.

An other principle of the invention is that the high temperature part and/or the low temperature part consists from at least two cyclones.

Finally the principle of the invention is, that into the output tube, arranged between the input chamber of the rotary kiln and the first cyclone of high temperature part a fuel input and a combustion air is led, eventually that to the output tube, arranged between the rotary kiln input chamber and the first cyclone of high temperature part, an input of hot gas and precalcinated raw material is led.

With arrangement according to the invention a substantial building height reduction of the cyclone exchanger at optimal exploitation of heat which is contained in gas led to the powdered raw material transport tube is achieved. As to the substantially less building height the invention can be additionally advantageously applied in areas with increased seismic activity, where for instance the usual high constructions could not be realized.

An other advantage of the solution according to invention is, that it can be used at calcinating exchangers, where for instance it is possible into the output gas tube between the rotary kiln and the lower cyclone of heat exchanger to lead additionally fuel and combustion air or gas with precalcinated raw material from the connected calcinating device.

OVERVIEW OF THE PICTURES ON THE DRAWINGS

The examples of realization of constrictions according to the invention are schematically shown on the attached drawings, where on the picture no. 1 a construction version of cyclone heat exchanger, on the picture no. 2 a simplified version of the low temperature part of the exchanger from the picture no. 1, on the picture no. 3 a version of realization of the beginning part of heat exchanger from picture no. 1 and oil the picture no. 4 a version of the powdered raw material transfer between the both parts of the cyclone exchanger are shown.

EXAMPLES OF REALIZATION OF THE INVENTION

The cyclone heat exchanger in the example realization according to picture no. 1 is divided to two parts, to a high temperature part 1 and to a low temperature part 2.

The high temperature part 1 is composed from three cyclones, from the first cyclone 11 with the hot gas input 110, hot gas output 111 and raw material output 112, from the second cyclone 12 with the hot gas input 120, hot gas output 121 and raw material output 122, and from thie third cyclone 13 with the lot gas input 130, hot gas output 131 and raw material output 132. The cyclones 11, 12 and 13 are mutually interconnected in direction of the hot gas stream consecutively such a way, that the output 111 of the first cyclone 11 is with the tube 42 connected with the input 120 of the second cyclone 12, where its output 121 is with the tube 43 connected with the input 130 of the third cyclone 13. The input 110 of first cyclone 11 is with the output tube 41 connected to the input chamber 30 of rotary kiln 3. The output 132 of third cyclone 13 is with help of the output tube 133 led to the lower part of tube 42 and similarly the output 122 of second cyclone 12 is led to the lower part of tube 41. The raw material output 112 from the first cyclone 11 is finally led with the output tube 113 to the input chamber 30 of rotary kiln 3 to next heat processing.

Similarly the low temperature part 2 is composed from lower cyclone 21 with the hot gas input 210, hot gas output 211 and raw material output 212, from the middle cyclone 22 with the hot gas input 220, hot gas output 221 and raw material output 222, and from the upper cyclone 23 with the hot gas input 230, hot gas output 231 and raw material output 232. By analogy similarly to high temperature part 1 also here the cyclones 21, 22 and 23 are mutually interconnected in direction R of the hot gas stream consecutively such a way, that the output 211 of the lower cyclone 21 is with the tube 44 connected with the input 220 of the middle cyclone 22, where its output 221 is with the tube 45 connected with the input 230 of the upper cyclone 23. Its output 231 then ends the area of heat exchanger according to invention and it is with its output tube 46 connected to the next technological part. The output 232 of upper cyclone 23 is with help of output tube 233 ended to the lower part of tube 44.

The high temperature part 1 and the low temperature part 2 are mutually interconnected with the connecting hot gas tube 4, which connects the output 131 of the highest—third cyclone 13 of high temperature part 1 with the input 210 of the lower cyclone 21 of low temperature part 2 and this such a way, that before the input 210 of the lower cyclone 21 a return loop 40 is formed on the interconnecting tube 4, where this return loop is laying under the lower cyclone 21 level. The raw material output 222 from the middle cyclone 22 is then with help of the output tube 223 ended to the ascending arm of the return loop 40 lower part, and this arm is led to the lower cyclone 21.

The raw material input 5, where this raw material has to be preheated before the input to the input chamber 30 of rotary kiln 3, and the input 5 is ended to the lower part of the tube 45 between the output 221 of middle cyclone 22 of the low temperature part 2 and between the input 230 and so to the upper cyclone 23 and after passing through the low temperature part 2 it is led to the third—the highest—cyclone 13 of the high temperature part 1 by mean of the tube 50, which is ended to the lower part of the tube 43 between its second cyclone 12 and the highest—the third—cyclone 13. The transport is realized with help of hot gas stream, which is in the lower part 500 of the transport tube 50 led in direction of the arrow T. To the warm gas stream is through the output tube 213 led the output 212 of lower cyclone 21 of the low temperature part 2.

As it is further shown on the picture no. 1, the high temperature part 1 is located higher in comparison to the low temperature part 2 such a way, that the connection 130 of the highest—e.g. third—cyclone 13 is laying according to invention higher as the connection 210 of the lower cyclone 21.

On the picture no. 2 there is shown an other version of cyclone exchanger realization according to the invention. The low temperature part 2 is in this example composed unlike to arrangement according to picture no. 1 from 2 cyclones only, from a middle cyclone 22 and a lower cyclone 21. The raw material input 5 is in this case situated in the lower part of tube 44, while the tube 45 is used for hot gas output from the cyclone exchanger. The input 210 of hot gas from the lower cyclone 21 is similarly to the previous case connected with interconnecting tube 4 with the not displayed high temperature part, similarly the raw material output 212 from the lower cyclone 21 is conducted out through the outlet tube 213 to the transport tube 50. The condition of a lower level position of the lower cyclone 21 in comparison to the position of third cyclone 13 according the invention remains preserved.

As it is demonstrated on the picture no. 3, the construction of cyclone heat exchanger according to the invention can be advantageously completed so, that into the output tube 41, with which the input chamber 30 of rotary kiln 3 is connected with the hot gas input 110 to the first cyclone 11, an additional fuel supply 6 and combustion air supply 60 is led, or the gas input 51 and precalcinated raw material input, eventually the both.

On the picture no. 4 the principal part of a construction version of the powdered raw material transport between the low temperature part 2 and the high temperature part 1 of the exchanger is demonstrated. In this case the transport tube 50 is realized substantially on the level of its connection to the tube 43 of high temperature part 1 of the exchanger, similarly as at the exemplar construction according to picture 1. The construction of the cyclone exchanger is completed with the transport mean 7 of one from usually used construction, to the beginning of which the output tube 213 of the output 212 of the lower cyclone 21 is led. The output of the transport mean 7 is provided with a conveyor 70, for instance with bucket conveyor, which is then connected to the transport tube 50. The remaining elements, demonstrated on the picture 4 correspond to the same elements according to the picture 1 and they are not described detailed. The conveyor 70 can be replaced with an other equivalent equipment.

The function of cyclone exchanger according to the invention is as follows. The raw material preheated in the exchanger, in this case raw material farina for dry method of cement clinker production, is fed with the output tube 113 into the input chamber 30 of rotary kiln 3. On contrary from the input chamber 30, through the output tube 41 the hot gas is taken away, where this hot gas has been created in the previous heat process and it is transporting a considerable amount of thermal energy. This hot gas is passing then stepwise in direction of the arrows R through output tubes 41 and tubes 42 and 43 and through the first cyclone 11, the second cyclone 12 and the third cyclone 13 of the high temperature part 1 of the exchanger and further it is led with the interconnecting tube 4 to the lower cyclone 21 of the low temperature part 2 of the exchanger and then passes in direction of the arrows R with help of tubes 44 and 45 through its remaining cyclones, the middle cyclone 22 and the upper cyclone 23, from which then it is led out with the output tube 46.

The powdered raw material is fed in direction of the arrow V with the input 5 into the lower part of the tube 45, in which it is mixed with the streaming hot gas, which is supplied from the output 221 of the middle cyclone 22 and streams to the input 230 of the following, in this case to upper cyclone 23. During the streaming of the powder-gas mixture a part of thermal energy of gas is transferred to the powdered raw material, than the powdered raw material is separated in the upper cyclone 23 from the gas, which is then led in direction of the arrow R into the output tube 46, while the heated up powdered raw material is with the output tube 233 led in direction of the arrow S from the output 232 out of the upper cyclone 23. The output tube 233 is ended into the lower part of tube 44, the in previous stage separated and heated up powdered raw material will be once again mixed with hot gas, which streams out from the lower cyclone 21 and so its temperature is in comparison to temperature in tube 45 higher. During the streaming of the powder—gas mixture the powdered raw material is heated up to a temperature, which is higher as the previous one, while the gas temperature is decreasing. The described process is repeated in each cyclones of the low and high temperature parts of the exchanger, whereas after passing through each cyclone the temperature of powdered raw material is increased, and the raw material continues to proceed in direction to input chamber 30 of rotary kiln 3 in direction of arrows S. On contrary, the hot gas proceeds in direction of arrows R to the output tube 46 and its temperature is stepwise decreasing.

The transmission of mediums between the low temperature part 2 and the high temperature part 1 is realized such a way, that the hot gas is led from the output 131 of the third cyclone 13 to the input 210 of lower cyclone 21 with help of an independent interconnecting tube 4 and the powdered raw material is added to the hot gas stream with help of the output tube 223 into the return loop 40, where it is mixed with the gas and it is additionally heated up. The partly preheated raw material, leaving the low temperature part 2 of exchanger, is led with output tube 213 to the transporting tube 50 and with it into the corresponding stage of the high temperature part 1 of exchanger after a mixing with external gas stream, which is led to the beginning 500 of the transporting tube 50 in direction of arrow T and where its temperature corresponds to the operational temperature between the two stages.

At realization according to picture no. 3 the capacity, eventually the efficiency of the system is increased with addition of additional fuel and combustion air with help of inputs 6 and 60. Such way the temperature conditions of hot gas and powdered raw material passing through the cyclone exchanger can be adapted and their temperature accommodated to optimal operational values. Similarly with addition of gas and precalcinated powdered raw material through the input 51 to the lower part of output tube 41 the final composition and properties of powdered raw material can be modified, which after passing the first cyclone 11 enters into the input chamber 30.

At the construction version, demonstrated on the picture 4, the powdered raw material is supplied with the output tube 213 into the transporting device 7, from which it is transported to the level of transporting tube 50.

It is evident, that the design of cyclone heat exchanger is not limited to the mentioned examples. The number of cyclones in the high temperature part 1 and in the low temperature part 2 has to be not the same. A precondition of its function it is however, that in each mentioned stages there are at least two cyclones. Also the value of mutual height difference of the connection of output 131 of hot temperature part cyclone 1—which is the highest and so in relation to the hot gas stream direction R the last one—and of the connection of the lowest, that means that in relation to the hot gas stream direction R the first cyclone of low temperature part 2 can be—at preserving a lower level of connection of the low temperature part 2—different and can be determined according to given temperature conditions and the form of design.

From the principle of the invention is also evident, that the beginning part 500 of the transporting tube 50 has not to be situated under the level of the lowest part of the return loop 40 of interconnecting tube 4, as it is demonstrated at example realizations on pictures no. 1, 2 and 4. This part of transporting tube can be advantageously located higher, naturally when its location fulfills the condition to be under the level of the output 212 of lower cyclone 21 of low temperature part 2.

INDUSTRIAL APPLICABILITY

The construction of cyclone heat exchanger according to the invention can be used namely for preheating of raw material farina at dry method of cement clinker production.

What is claimed is:

1. A cyclone heat exchanger for preheating of powdered raw material comprising a set of cyclones, which are arranged in a series and connected with hot gas tubes in such a way that the input of a first cyclone is connected to a hot gas source and the output of each cyclone is assigned to an input of a next cyclone, whereas the output of separated powdered raw material from each cyclone is supplied to a hot gas tube assigned to a hot gas output from the previous cyclone, characterised in that the set of cyclones is divided into two parts, a high temperature part (1) closer to the hot gas source and a low temperature part (2), where each part is comprised of at least two cyclones and wherein the high temperature part and the low temperature part are mutually interconnected with an interconnecting tube (4), wherein a return loop (4) is created in the interconnecting tube (4) on an end closer to low temperature part (2) in such a way that a lowest part of the return loop is located under the level of a lower cyclone (21) of low temperature part (2) wherein substantially all of a gas issued from a highest cyclone (13) of high temperature part (1) is provided to lower cyclone (21) of low temperature part (2) by interconnecting tube (4), and that the high temperature part (1) and low temperature part (2) are mutually situated so that the connection of warm gas input (130) of a highest cyclone (13) of high temperature part (1) is located higher than a connection of warm gas input (210) of lower cyclone (21) of low temperature part (2), whereas an output (222) of powdered raw material of a higher cyclone (22) of low temperature part (2) is ended into an ascending part of the return loop (40), whereas the high temperature part (1) is further provided with a transport tube (50) into which an output tube (213) of lower cyclone (21) of low temperature part (2) is ended and which is self ended into a tube (43) interconnecting the input (130) of hot gas of highest cyclone (13) of high temperature part (1) and the hot gas output (121) from a previous cyclone (12) of high temperature part (1).

2. A cyclone heat exchanger according to the claim 1, characterised in that an output part (500) of transporting tube (50) is situated under the level of an output (212) of powdered raw material from the lower cyclone (21) of the low temperature part (2).

3. A cyclone heat exchanger according to claim 1, characterised in that the high temperature part (1) and/or the low temperature part (2) are composed from at least two cyclones.

4. A cyclone heat exchanger according to claim 1, additionally comprising an output tube (41), arranged between an input chamber (30) of a rotary kiln (3) and a first cyclone (11) of high temperature part (1), wherein a fuel supply (6) and a combustion air supply (60) are ended in output tube (41).

5. A cyclone heat exchanger according to claim 1, additionally comprising an output tube (41), arranged between an input chamber (30) of a rotary kiln (3) and a first cyclone (11) of high temperature part (1), wherein an input of hot gases and precalcinated raw material (51) is ended in output tube (41).

* * * * *